(12) United States Patent
Balachandriah et al.

(10) Patent No.: US 8,261,018 B2
(45) Date of Patent: Sep. 4, 2012

(54) MANAGING DATA STORAGE SYSTEMS

(75) Inventors: Sridhar Balachandriah, Karnataka (IN); Satish Kumar Mopur, Karnataka (IN); Duvvuri Rama Kiron, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 592 days.

(21) Appl. No.: 12/501,410

(22) Filed: Jul. 11, 2009

(65) Prior Publication Data

US 2010/0299489 A1    Nov. 25, 2010

(30) Foreign Application Priority Data

May 25, 2009   (IN) .......................... 1205/CHE/2009

(51) Int. Cl.
*G06F 12/00* (2006.01)
*G06F 13/00* (2006.01)

(52) U.S. Cl. ........ 711/117; 711/154; 711/161; 711/162; 711/170; 711/171; 711/204

(58) Field of Classification Search .................. 711/117, 711/154, 161, 162, 170, 171, 204
See application file for complete search history.

(56) References Cited

U.S. PATENT DOCUMENTS

2007/0168634 A1 *   7/2007   Morishita et al. ............. 711/170

* cited by examiner

*Primary Examiner* — Midys Rojas

(57) ABSTRACT

A method, system and computer program product for managing data storage systems. The data storage system being coupled to a volume storage pool as data storage resource, the data storage system presenting at least one virtual volume as a storage resource to a host device, the method for managing the data storage system comprising collecting the volume storage pool occupancy and the virtual volume consumption; trending the volume storage pool and the virtual volumes consumption; forecasting the volume storage pool occupancy and virtual volume consumption; and recommending at least one action based on the forecasted values of storage pool occupancy data and virtual volume consumption data. The method may further comprise detecting a rapid increase or surge in the volume storage pool occupancy data.

16 Claims, 4 Drawing Sheets

MANAGING DATA STORAGE SYSTEMS

RELATED APPLICATIONS

Benefit is claimed under 35 U.S.C. 119(a)-(d) to Foreign application Serial No. 1205/CHE/2009 entitled "Managing Data Storage Systems" by Hewlett-Packard Development Company, L.P., filed on 25 May, 2009, which is herein incorporated in its entirety by reference for all purposes.

BACKGROUND

Storage domains of a plurality of host computers are often stored in a single storage device. This tendency is promoted by, for example, a disk array. The disk array provides redundancy of the storage domains by a plurality of magnetic disk devices in a system, thereby increasing reliability and providing a necessary storage domain as a logical volume to a plurality of hosts. One of the merits of using this disk array is capacity expansion of the logical volume.

For example, when a computer has used up a logical volume provided by a disk array, a free space in the disk array is selected with an arbitrary length to be allocated as a logical volume, so that the computer can connect this logical volume to a logical volume in use, thereby expanding the storage domain. This function of volume expansion can also be performed on-line and is called on-line volume expansion. The on-line volume expansion enables to expand a range of the logical volume storage domain corresponding to data increasing as time passes, without stopping the application and accordingly, enables to expand the application operation time. Moreover, upon volume capacity transfer, there is no need of data transfer between volumes, which significantly reduces the storage management cost.

Conventionally, a logical volume user should report to a logical volume provider when expanding the on-line volume. In a small-size site such as within a single enterprise, there is no sudden data increase and it is not necessary to perform on-line volume expansion all the time. However, in a large-size site such as a data center where a plurality of enterprises utilize data, there is a possibility of a sudden data increase from computers of the plurality of enterprises and it is necessary to perform the on-line volume expansion more often. Moreover, in order to enhance the utilization effect of a storage domain of a disk array or the like, it is necessary to provide a volume to a plurality of users in a single storage device without waste.

In order to effectively use a storage domain in a storage device, it is necessary to manage the storage area in unit of a logical volume of a small capacity and to expand the logical volume with the small-capacity logical volume when required. When using the on-line volume expansion in this condition, there is a case that a request for the on-line volume expansion is simultaneously caused by a plurality of users and the logical volume provider may not be able to satisfy the requests. In the worst case, the on-line volume expansion cannot be performed due to lack of physical disk space in array and possibly resulting in suspension of the computer I/O operations.

BRIEF DESCRIPTION OF THE DRAWINGS

Embodiments of the present invention are illustrated by way of example only and not limited to the figures of the accompanying drawings, in which like references indicate similar elements and in which.

Other features of the present embodiments will be apparent from the accompanying drawings and from the detailed description that follow.

DETAIL DESCRIPTION

A method, system and computer program product for managing a storage system is described. In the following detailed description of various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
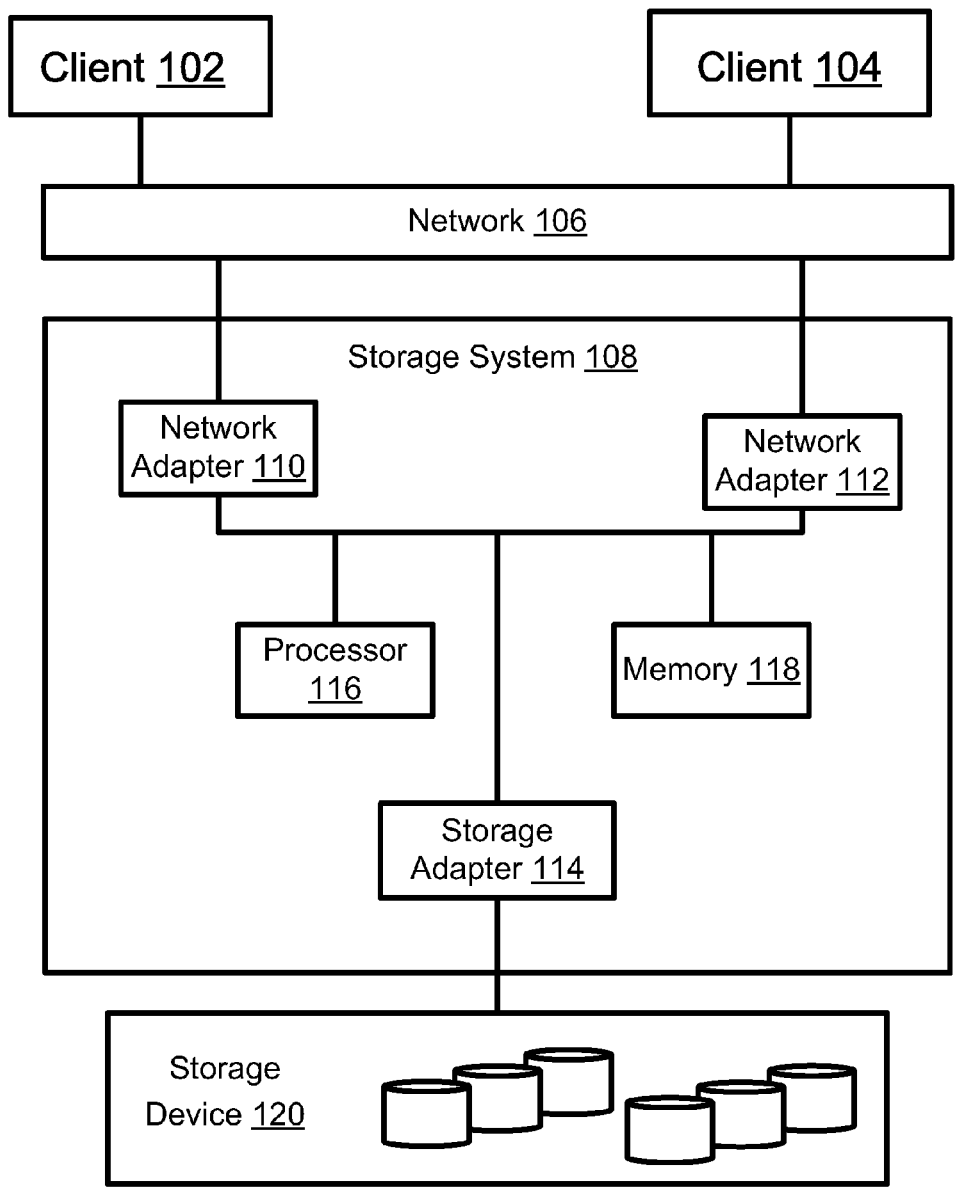
FIG. 1 shows a schematic diagram of an exemplary storage area network with physical links.

FIG. 1 is a schematic block diagram of an exemplary storage system environment in accordance with an embodiment of the present invention. The storage system environment comprises of a storage system 108 operatively interconnected with one or more storage devices 120, such as disks. The disks 120 are illustratively organized into one or more disk. A computer network 106 connects the storage system 108 with a plurality of clients 102, 104. The network 106 may comprise any suitable internetworking arrangement including, for example, a local area network (LAN), wide area network (WAN), virtual private network (VPN), etc. Additionally, the network 106 may utilize any form of transport media including, for example, Ethernet and/or Fibre Channel (FC). The client may comprise any form of computer that interfaces with the storage system including, for example, an application server.

The storage system 108 is configured to provide storage service for both file and block protocol access to information stored on storage devices in an integrated manner. In this context, the storage system may be embodied as a storage appliance, which denotes a computer having features such as simplicity of storage service management and ease of storage reconfiguration, including reusable storage space, for users (system administrators) and clients of network attached storage (NAS) and storage area network (SAN) deployments.

The storage system 108 illustratively comprises a plurality of processor 116, a plurality of memory 118, a plurality of network adapters 110, 112 and a storage adapter 114 interconnected by a system bus. The storage system 108 also includes a storage operating system that provides a virtualization system to logically organize the information as a hierarchical structure of named data containers, such as directory, file and virtual disk (virtual volume) storage objects on storage devices, such as physical disks in storage arrays.

Whereas clients of a NAS-based network environment have a storage viewpoint of files, the clients of a SAN-based network environment have a storage viewpoint of blocks or disks. The storage system 108 may present disks to SAN clients through the creation of logical unit numbers (LUNS) or virtual volume. A virtual volume is a special file type that is implemented by the virtualization system and translated into an emulated disk as viewed by the SAN clients. The storage system thereafter makes these emulated disks accessible to the SAN clients through controlled exports. One or more virtual volumes may be stored within each volume.

In the illustrative embodiment, the memory 118 comprises storage locations that are addressable by the processor and adapters for storing software program code and data structures associated with the present invention. A portion of memory 118 may be organized as a cache for storing data structures for use by the storage operating system during runtime operation. The processor and adapters may, in turn, comprise processing elements and/or logic circuitry configured to execute the software code and manipulate the data structures. The storage operating system, portions of which is typically resident in memory and executed by the processing elements, functionally organizes the storage system by, inter alia, invoking storage operations in support of the storage service implemented by the storage system.

The network adapter 110 may comprise a network interface controller (NIC) that couples the storage system to one or more clients over point-to-point links, wide area networks, virtual private networks implemented over a public network (Internet) or a shared local area network. In addition, the storage network "target" adapter 112 couples the storage system to clients that may be further configured to access the stored information as blocks or disks. The network target adapter 112 may comprise a FC host bus adapter (HBA) needed to connect the system to a SAN network switch or directly to the client system.

The storage adapter 114 cooperates with the storage operating system executing on the storage system to access information requested by the clients. The information is retrieved by the storage adapter and, if necessary, processed by the processor 116 (or the adapter 114) prior to being forwarded over the system bus to the network adapters 110, 112, where the information is formatted into packets or messages and returned to the clients.

Figure 2:
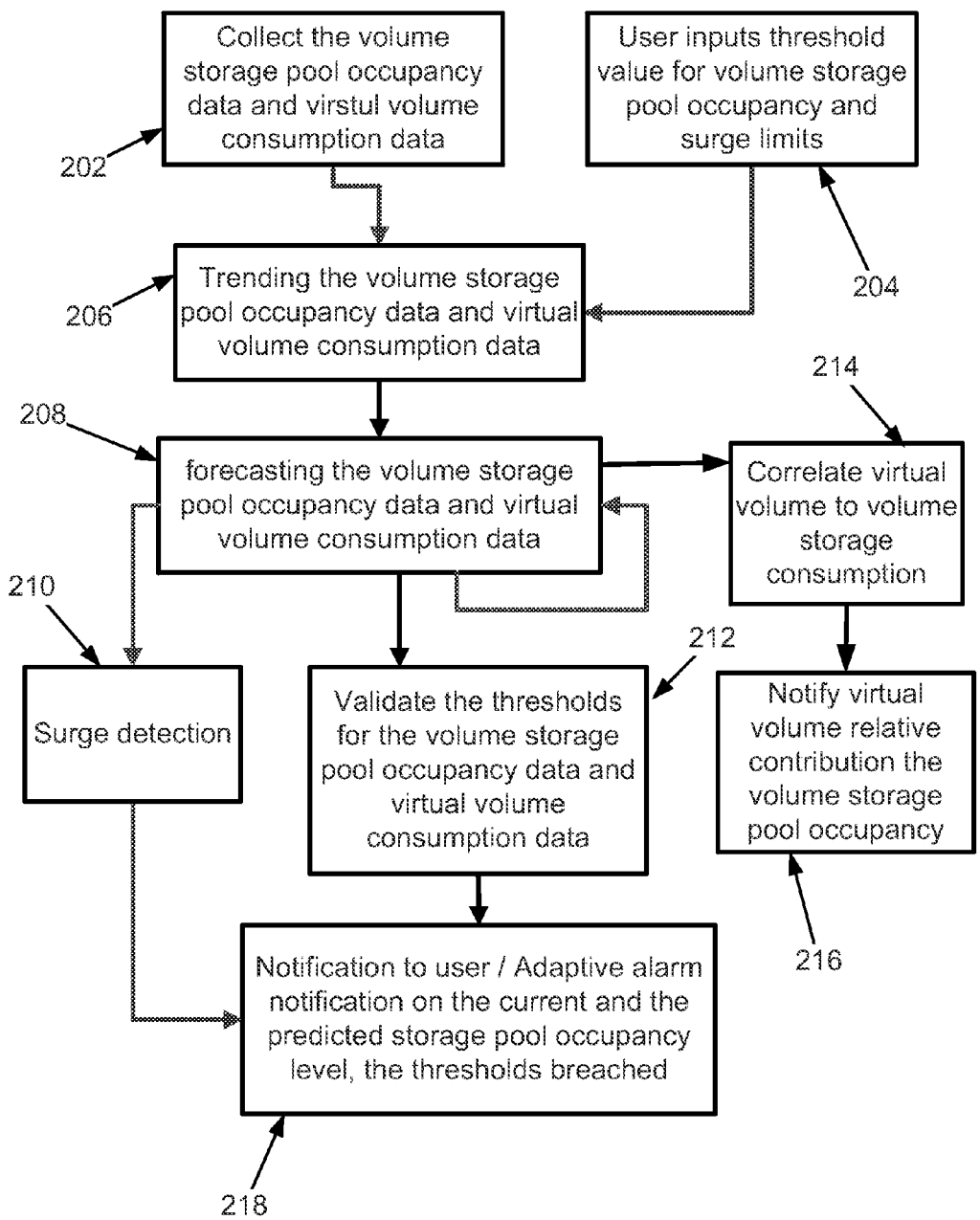
FIG. 2 is a flow diagram illustrating steps involved in managing storage system.

FIG. 2 illustrates steps involved in the management of a storage system. The storage system may have diverse abilities in terms of huge storage capacity, performance characteristics and provisioning capabilities to meet the growing storage demands. The storage systems may allow large virtual volumes to be presented to hosts, which are backed by a pool of significantly less physical storage. The representation of less physical storage as large virtual volumes is also known as thin provisioning (ThP). The ThP is the aggregate off all the logical volumes carved out of disks. A virtual volume is the volume presented to the host which appears to have much more capacity than is the actually present.

At step 202 of FIG. 2, a current data for the storage system and the virtual volume are collected. The collected data may include the volume storage pool occupancy data and virtual volume consumption data. The virtual volume consumption data may comprise the amount of volume consumed by the virtual volumes in the volume storage pool. The virtual volume consumption data may also comprise the rate of consumption of the volume storage pool by the virtual volume.

The data points may be collected over a period of time by a host agent. The time period for data collection is configurable and may be configured by a storage system administrator. The data points are stored in a memory on a management station in real time database system.

At step 204 of FIG. 2, the threshold value for storage volume pool occupancy and surge limits is collected. A surge may comprise a rapid rate of growth in the volume storage pool occupancy data and the virtual volume consumption data. The storage system administrator may provide more than one threshold value for multiple volume storage pool occupancy level and surge level. The system administrator may enter the threshold values on a graphical user interface on the management station. The threshold value for storage volume pool occupancy and surge limit may be stored in a real time database.

At step 206 of FIG. 2, the volume storage pool occupancy data and virtual volume data is trended. The trending of the volume storage pool occupancy data and virtual volume data may be done continuously for a predetermined time period. The volume storage pool occupancy data and virtual volume data may be trended over time using a standard mathematical equation. As an example embodiment the trending of the volume storage pool occupancy data and virtual volume data is done using a second order polynomial. An example of a second degree polynomial is $$f(x)=ax^2+bx+c \qquad (1)$$

The coefficient a, b and c in the above equation may be determined using a standard mathematical methods of solving a second degree polynomial. As an example the coefficients of the above equation may be determined using Gauss Seidel iterative method. A regression technique may be used to solve the above equation. A standard available error minimization technique may be used to reduce the error in the trending of the volume storage pool optimization and virtual volume consumption data. An error may be defined as the difference in the trended data and the actual data for a particular time period. An example of an error minimization technique is Least Mean Square method. The coefficient of the above equation may be continuously modified over a time period to include the error coefficient in order to reduce the deviations in predicted output values.

At step 208 of FIG. 2, the volume storage pool occupancy data and the virtual volume consumption data is forecasted using the equation (1). The volume storage pool occupancy data and the virtual volume consumption data may be forecasted for a predetermined time period. The time period may be predetermined by an administrator of the storage system. The forecasted data may be presented in form of a graphical user interface, graph, chart or a report, for instance. The forecasted volume storage pool occupancy data and the virtual volume consumption data may be stored in a real time data base.

At step 212 of FIG. 2, the threshold value for the volume storage pool occupancy data and the virtual volume consumption data is validated with the forecasted data. A threshold value for volume storage pool is the percentage of used space with respect to the total space. A threshold value for virtual volume may represent a relationship between unallocated volume storage pool to the available volume storage pool space.

At step 218 of FIG. 2, a notification to the administrator is sent when the forecasted data is greater than or equal to the threshold value for the volume storage pool occupancy data and the virtual volume consumption data. The notification may be sent to the administrator based on the current value of the volume storage pool occupancy data and the virtual volume consumption data. The notification may also be send when the threshold value is breached for the volume storage pool occupancy data. As an example embodiment an adaptive notification can be generated based on multiple threshold levels. As an example information notification is sent to the administrator for the breach of the first threshold value. A warning notification can be sent on the breach of the second threshold value and a critical notification on the breach of a third threshold value. The adaptive notification is customizable and may be disabled or modified by the administrator.

In an example embodiment, at step 210 of FIG. 2, the surge in the values of the volume storage pool occupancy data and the virtual volume consumption data is detected. A surge is a rapid rate of growth in the volume storage pool occupancy data and the virtual volume consumption data. The surge may be detected by monitoring the deviation from a trended value to an actual value during the regression analysis in equation 1. According to an example embodiment if a large error or deviation is detected during regression, a segmented regression may be performed over the segment where the deviation is large, around actual values in that segment. If the slope of this segment is large compared to slope of the normal regression, this point may be tagged as surge.

At step 218, a notification to the administrator is sent when the surge in the volume storage pool occupancy data and the virtual volume consumption data is close to the threshold value predetermined by the administrator. As an example embodiment an adaptive notification can be generated based on multiple threshold levels. As an example information notification is sent to the administrator for the breach of the first threshold value. A warning notification can be sent on the breach of the second threshold value and a critical notification on the breach of a third threshold value. The adaptive notification is customizable and may be disabled or modified by the administrator.

In an example embodiment, at step 214 of FIG. 2, the relative contribution of the virtual volumes to the volume storage pool data is determined. The relative contribution of the virtual volumes to the volume storage pool data is determined using a statistical technique. An example of the statistical technique is a covariance technique. The covariance technique may be applied over a predetermined time period. As an example, a storage system has three virtual volumes VVol1, VVol2 and VVol3. The cumulative covariance may be calculated for each virtual volume to determine the individual virtual volume contribution to the volume storage pool occupancy. The ratios across the cumulative covariance of the virtual volumes with reference to a volume storage pool may be computed to determine contribution by individual virtual volumes to the volume storage pool.

At step 216 of FIG. 2, the administrator is notified of the contribution of the virtual volumes in the volume storage pool occupancy. The administrator may, according to an example embodiment, use the contribution data to take an action. The action may comprise adding disks in the volume storage pool, allocating more volume storage pool to the virtual volume, de-fragmentation of the disks, or transferring data to an external storage system, for instance.

Figure 3:
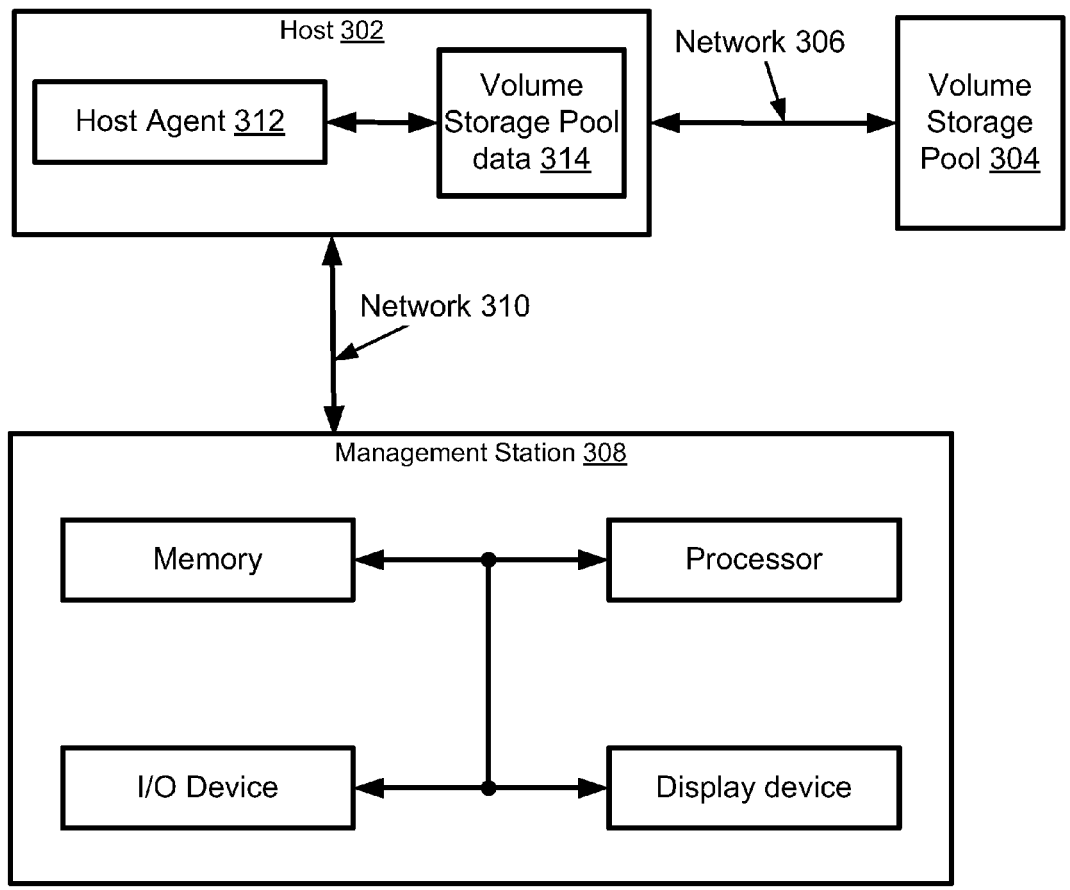
FIG. 3 illustrates a storage system according to an example embodiment.

FIG. 3 illustrates a storage system according to an example embodiment. The storage system comprises a volume storage pool 304, a host 302 and a management station 308. The host 302 is connected to the volume storage pool 304 via a network 306. The management station 308 is connected to the host 302 via a network 310.

The host 302 may comprise of a host agent 312 and an interface to the volume storage pool for collection of volume storage pool data 314. The host agent may collect the volume storage pool occupancy data and the virtual volume consumption data. The host agent may send this data to the management station. The host agent may also store a copy of the volume storage pool occupancy data and the virtual volume consumption data.

The management station 308 may comprises a processor, a display device, a memory and an I/O device. The management station also comprises a graphical user interface. The storage system administrator may input the threshold values for volume storage pool occupancy and surge on the graphical user interface. The collected volume storage pool occupancy data and virtual volume consumption data may be provided by the host agent to the management station. The management station may be configured to trend the volume storage pool occupancy and the virtual volumes consumption. The management station may use the step 206 of FIG. 2 for trending the volume storage pool occupancy and virtual volume consumption data. The management station may be configured to forecast the volume storage pool occupancy and virtual volume consumption data. The management station may use step 208 of FIG. 2 for forecasting the volume storage pool occupancy and virtual volume consumption data.

According to an embodiment the forecasted value of the volume storage pool occupancy data and the virtual volume consumption data may be displayed on the managing station in the form of chart or report for the administrator. The management station may be configured to raise a notification or alarm when the forecasted data is near the threshold value defined by the administrator.

Figure 4:
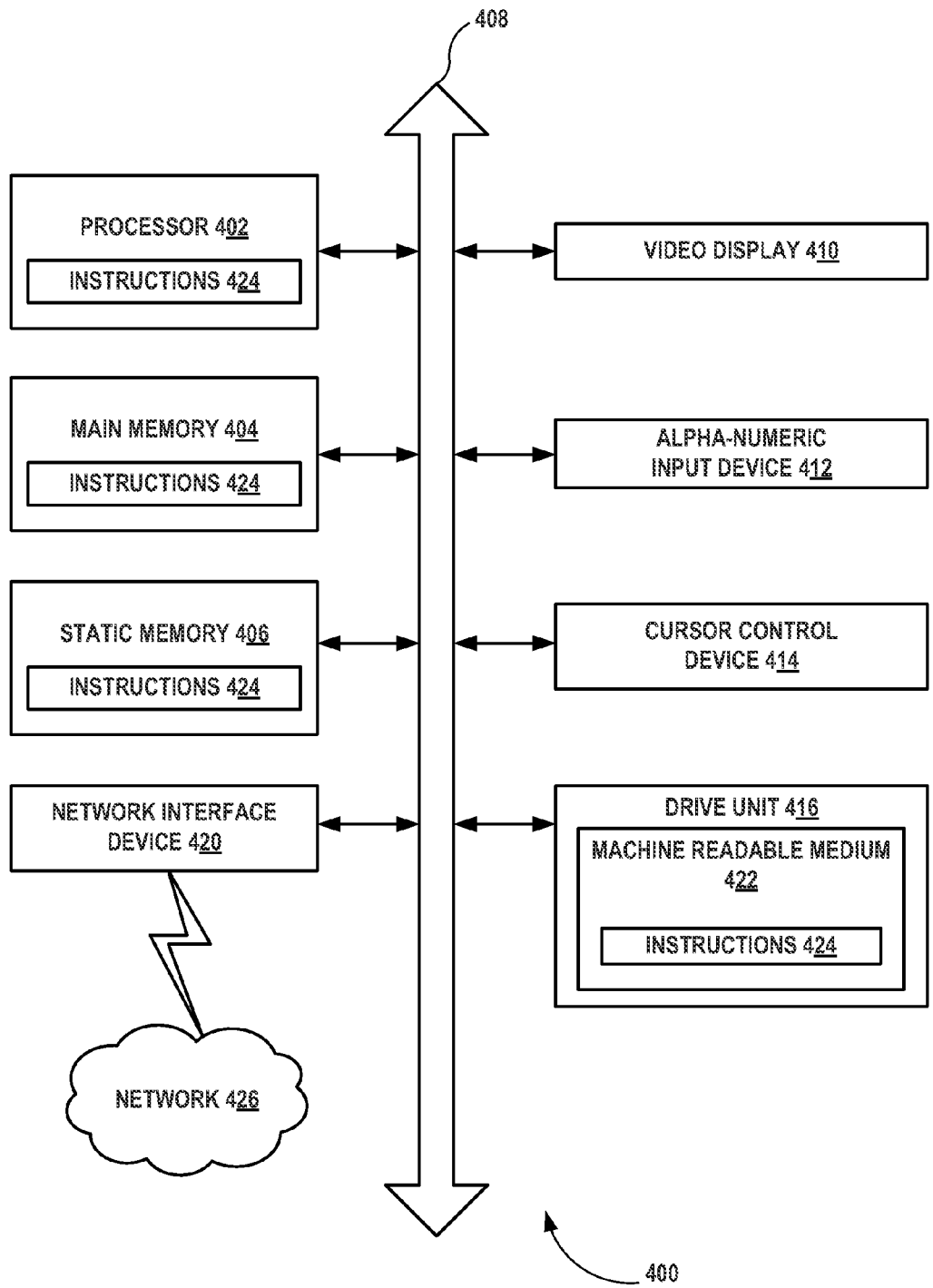
FIG. 4 is a diagrammatic system view of a data processing system in which any of the embodiments disclosed herein may be performed, according to one embodiment.

FIG. 4 is a diagrammatic system view 400 of a data processing system in which any of the embodiments disclosed herein may be performed, according to one embodiment. Particularly, the diagrammatic system view of FIG. 4 illustrates a processor 402, a main memory 404, a static memory 406, a bus 408, a video display 410, an alpha-numeric input device 412, a cursor control device 414, a drive unit 416, a network interface device 420, a machine readable medium 422, instructions 424 and a network 426.

The diagrammatic system view 400 may indicate a personal computer and/or a data processing system in which one or more operations disclosed herein are performed. The processor 402 may be a microprocessor, a state machine, an application specific integrated circuit, a field programmable gate array, etc. The main memory 404 may be a dynamic random access memory and/or a primary memory of a computer system. The static memory 406 may be a hard drive, a flash drive, and/or other memory information associated with the data processing system.

The bus 408 may be an interconnection between various circuits and/or structures of the data processing system. The video display 410 may provide graphical representation of information on the data processing system. The alpha-numeric input device 412 may be a keypad, keyboard and/or any other input device of text (e.g., a special device to aid the physically handicapped). The cursor control device 414 may be a pointing device such as a mouse. The drive unit 416 may be a hard drive, a storage system, and/or other longer term storage subsystem.

The network interface device 420 may perform interface functions (e.g., code conversion, protocol conversion, and/or buffering) required for communications to and from the network 426 between a number of independent devices (e.g., of varying protocols). The machine readable medium 422 may provide instructions on which any of the methods disclosed herein may be performed. The instructions 424 may provide source code and/or data code to the processor 402 to enable any one or more operations disclosed herein.

According to an example embodiment, the method of managing storage system may enable administrators for effective planning for storage capacity expansion by growth trend analysis and predicting the storage needs. The administrator may plan for optimal addition of new storage thereby reducing the total cost of ownership and taking advantage of the constant fall in cost per unit of memory.

It will be appreciated that the various embodiments discussed herein may not be the same embodiment, and may be grouped into various other embodiments not explicitly disclosed herein. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

Although the present embodiments have been described with reference to specific embodiments, it will be evident that various modifications and changes may be made to these embodiments without departing from the broader spirit and scope of the various embodiments. For example, the various devices, described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuits (ASIC)).

The invention claimed is:

1. A method for managing a data storage system, said data storage system being coupled to a volume storage pool, the data storage system presenting at least one virtual volume as a storage resource to a host device, the method for managing the data storage system comprising:
   collecting the volume storage pool occupancy and the virtual volume consumption;
   trending the volume storage pool occupancy and the virtual volume consumption;
   defining a threshold value for a rapid increase or surge in volume storage pool occupancy;
   tracking the rapid increase or surge in volume storage pool occupancy using a segmented regression;
   generating a notification when the surge in volume storage pool occupancy is at the threshold value;
   forecasting the volume storage pool occupancy and virtual volume consumption; and
   recommending at least one action based on the forecasted value of the volume storage pool occupancy and virtual volume consumption wherein the action may be selected from a group comprising:
   adding extra volume to the volume storage pool; and
   migrating the data from the volume storage pool to a second volume storage device.

2. The method of claim 1, further comprising:
   defining more than one threshold values for the volume storage pool occupancy; and
   generating different notifications in response to crossing of the different threshold values.

3. The method of claim 1, further comprising:
   defining more than one threshold values for the surge in the volume storage pool occupancy; and
   generating different notifications in response to crossing of the different threshold values.

4. The method of claim 1 wherein the trending the volume storage pool occupancy and the virtual volume consumption is done using a second degree polynomial.

5. The method of claim 4 further comprising determining the coefficient for the second degree polynomial using Gauss Seidel method.

6. The method of claim 1, wherein the storage system is a storage area network.

7. The method of claim 1 further comprising determining the contribution of the virtual volumes to the volume storage pool space consumption.

8. The method of claim 7 wherein contribution of virtual volumes to the storage pool space consumption is determined using a covariance technique.

9. A data storage system to coupled to a volume storage pool available for allocation of volumes in the data storage system, the data storage system being operable to present at least one virtual volume as a storage resource to a host device, said data storage system comprising:
   a host agent for collecting information related to volume storage pool occupancy and virtual volume consumption; and
   a management station comprising a processor and a memory, wherein the management station is configured to:
   trend the volume storage pool occupancy and the virtual volumes consumption;
   define a threshold value for a rapid increase or surge in volume storage pool occupancy;
   track the rapid increase or surge in volume storage pool occupancy using a segmented regression;
   generate a notification when the surge in volume storage pool occupancy is at the threshold value;
   forecast a value of the volume storage pool occupancy and virtual volume consumption data; and
   recommend at least one action based on the forecasted value of the volume storage pool occupancy and virtual volume consumption.

10. The data storage system of claim 9, wherein the management station is further configured to:
    monitor the volume storage pool occupancy data and the virtual volume consumption data; and
    generate an event notification when the volume storage pool occupancy and the forecasted volume storage pool occupancy is at a threshold value for the volume storage pool occupancy.

11. The data storage system of claim 10, wherein defining the threshold value comprises defining different threshold values, and wherein performing the action comprises performing different respective actions in response to crossing of the different threshold values.

12. The data storage system of claim 11, wherein the action may be selected from a group comprising:
    adding extra volume to the volume storage pool; and
    migrating the data from the volume storage pool to a second volume storage device.

13. The data storage system of claim 9 wherein the trending the volume storage pool occupancy and the virtual volumes consumption is done using a second degree polynomial.

14. The data storage system of claim 9, wherein management station is further configured to determine the contribution of virtual volumes to the volume storage pool space consumption.

15. The data storage system of claim 14 wherein contribution of virtual volumes to the storage pool space consumption is determined using a covariance technique.

16. A computer program product for managing a storage system, the product comprising a non-transitory computer readable medium having program instructions recorded therein, which instructions, when read by a computer, cause the computer to configure in a data storage system being coupled to a volume storage pool, the data storage system presenting at least one virtual volume as a storage resource to a host device, the method for managing the data storage system comprising:
 collecting the volume storage pool occupancy data and the virtual volume consumption data;
 trending the volume storage pool occupancy data and the virtual volumes consumption data;
 defining a threshold value for a rapid increase or surge in volume storage pool occupancy;
 tracking the rapid increase or surge in volume storage pool occupancy using a segmented regression;
 generating a notification when the surge in volume storage pool occupancy is at the threshold value;
 forecasting the volume storage pool occupancy data and virtual volume consumption data; and
 recommending at least one action based on the forecasted value of the volume storage pool occupancy and virtual volume consumption, wherein the action may be selected from a group comprising:
 adding extra volume to the volume storage pool; and
 migrating the data from the volume storage pool to a second volume storage device.

* * * * *